(12) United States Patent
Mattsson (10) Patent No.: US 7,782,978 B2
(45) Date of Patent: Aug. 24, 2010

(54) PHASE CORRECTION OF A CONSTANT ENVELOPE SIGNAL WITHOUT INTRODUCING AMPLITUDE MODULATION

(75) Inventor: Anders S. Mattsson, Mason, OH (US)

(73) Assignee: Harris Corporation, Melbourne, FL (US)

( * ) Notice: Subject to any disclaimer, the term of this patent is extended or adjusted under 35 U.S.C. 154(b) by 1168 days.

(21) Appl. No.: 11/403,458

(22) Filed: Apr. 13, 2006

(65) Prior Publication Data
US 2007/0242772 A1    Oct. 18, 2007

(51) Int. Cl.
*H04L 25/03*    (2006.01)
*H04L 27/28*    (2006.01)

(52) U.S. Cl. .................. 375/296; 375/260
(58) Field of Classification Search .................. 375/254, 375/278, 284–285, 296, 260; 370/317; 455/50.1, 455/63, 63.1, 67.1, 114.3, 295, 501, 67.13; 330/135, 149; 381/2–3
See application file for complete search history.

(56) References Cited

U.S. PATENT DOCUMENTS

| 5,499,389 | A  | * | 3/1996  | Victorin .................. 455/119 |
| 5,900,778 | A  |   | 5/1999  | Stonick et al. |
| 6,266,517 | B1 | * | 7/2001  | Fitzpatrick et al. ....... 455/114.3 |
| 6,285,412 | B1 |   | 9/2001  | Twitchell |
| 6,313,703 | B1 | * | 11/2001 | Wright et al. ............... 330/149 |
| 6,335,767 | B1 |   | 1/2002  | Twitchell et al. |
| 6,531,917 | B2 |   | 3/2003  | Yamamoto et al. |
| 6,587,514 | B1 |   | 7/2003  | Wright et al. |
| 6,674,808 | B1 |   | 1/2004  | Griph et al. |
| 6,677,820 | B2 |   | 1/2004  | Miyatani |
| 6,812,792 | B2 | * | 11/2004 | Mattsson et al. ............ 330/149 |
| 6,928,122 | B2 | * | 8/2005  | Opas et al. .................. 375/296 |
| 7,236,052 | B2 | * | 6/2007  | Saed et al. .................. 330/149 |
| 7,289,773 | B2 | * | 10/2007 | Braithwaite .................. 455/91 |
| 7,333,561 | B2 | * | 2/2008  | Pinckley et al. ............. 375/297 |
| 2004/0258176 | A1 | * | 12/2004 | Mattsson et al. ............ 375/297 |
| 2005/0001679 | A1 | * | 1/2005  | Saed .......................... 330/149 |
| 2005/0002470 | A1 | * | 1/2005  | Saed et al. .................. 375/296 |
| 2005/0163268 | A1 | * | 7/2005  | McCallister ................. 375/346 |
| 2006/0158255 | A1 | * | 7/2006  | Saed .......................... 330/149 |
| 2006/0178120 | A1 | * | 8/2006  | Puma ....................... 455/114.3 |
| 2007/0243836 | A1 | * | 10/2007 | Cabrera et al. .............. 455/102 |

OTHER PUBLICATIONS

U.S. Patent Appln. Publication US 2004/0258176A1, published Dec. 23, 2004.
U.S. Patent Appln. Publication US 2004/0259509A1, published Dec. 23, 2004.

(Continued)

*Primary Examiner*—Tesfaldet Bocure
*Assistant Examiner*—Lawrence B Williams
(74) *Attorney, Agent, or Firm*—Tarolli, Sundheim, Covell & Tummino LLP (57) ABSTRACT

Systems and methods are provided for precorrecting a constant envelope input signal. A phase precorrection component generates a precorrected input signal by applying a phase precorrection to the input signal. The applied phase correction alters an associated phase of the input signal without applying amplitude modulation to the signal. A linear distortion source applies amplitude distortion and phase distortion to the precorrected input signal. The applied phase correction mitigates the phase distortion applied by the linear distortion source.

19 Claims, 3 Drawing Sheets

OTHER PUBLICATIONS

U.S. Patent Appln. Publication US 2005/0024138A1, published Feb. 3, 2005.
U.S. Patent Appln. Publication US 2005/0163268A1, published Jul. 28, 2005.
U.S. Patent Appln. Publication US 2005/0180526A1, published Aug. 18, 2005.
U.S. Patent Appln. Publication US 2006/0008030A1, published Jan. 12, 2006.

* cited by examiner

PHASE CORRECTION OF A CONSTANT ENVELOPE SIGNAL WITHOUT INTRODUCING AMPLITUDE MODULATION

BACKGROUND OF THE INVENTION

1. Field of the Invention

This invention relates to the field of signal correction in a communication system, and, more particularly, to precorrection of the phase of an information-carrying constant envelope signal without introducing amplitude modulation to the signal.

2. Description of the Prior Art

One difficulty in transmitting a constant envelope signal (e.g., frequency or phase modulated (FM/PM) signals) is that any linear distortion on the transmitted signal results in nonlinear distortion at the receiver. For example, in an FM radio signal, significant audio distortion and degraded stereo separation can result from even fairly minute linear distortion. One source of linear distortion comes from linear filtering effects occurring downstream of a power amplifier. If the filtering effects pass a relatively wide band of frequencies, the filtering effects will add very little distortion to the signal and can be ignored for most applications. Unfortunately, not all sources of post-amplification linear distortion have a wide frequency passband.

For example, in an application where a constant envelope signal needs to be combined with other signals into a common antenna, some form of radio frequency (RF) combining system is generally utilized. The RF combining system, referred to as a filterplexer, can be modeled, in general, as a linear filter that produces in-band distortion and a band limiting of the output signal. This manifests itself as amplitude error and group-delay/phase error. For a phase modulated signal, the phase component of this in-band response will result in signal errors (e.g., audio distortion in FM broadcasting and symbol errors in a BPSK/QPSK system) at one or more associated receivers. This distortion is generally compensated for at an equalizer at the filtering element, but practical equalizers can only partially mitigate the distortion. For high power broadcast transmitters, even this partial mitigation requires physically large, expensive, high power equalizers. These equalizers require manual tuning to account for temperature variations and other sources of drift, representing an additional complication in the transmission process.

SUMMARY OF THE INVENTION

In accordance with one aspect of the present invention, a system is provided for precorrecting a constant envelope input signal. A phase precorrection component generates a precorrected input signal by applying a phase precorrection to the input signal. The applied phase correction alters the associated phase of the input signal without applying amplitude modulation to the signal. A linear distortion source applies amplitude distortion and phase distortion to the precorrected input signal. The applied phase correction mitigates the phase distortion applied by the linear distortion source.

In accordance with another aspect of the invention, a method is provided for transmitting a constant envelope signal. A phase correction is calculated as a function of a desired output phase. The calculated phase precorrection is applied to a constant envelope signal to provide a precorrected signal. The phase precorrection adjusts the phase of the constant envelope signal without imposing amplitude modulation on the constant envelope signal. The precorrected signal is amplified at a limiting amplifier. The limiting amplifier substantially eliminates any amplitude correction associated with the precorrected constant envelope signal. The amplified signal is provided to a filtering element that imposes linear distortion on the amplified signal, such that the phase of the amplified signal becomes equal to the desired output phase.

In accordance with yet another aspect of the present invention, a precorrection system is provided for applying a linear phase precorrection to a constant envelope input signal. A rectangular-to-polar converter separates the constant envelope input signal into a phase component and a magnitude component. An error model generates an error term from the phase component of the input signal. A first combining element combines the error term with a term representing a desired output phase for an associated distortion source to provide a combined signal. A phase extraction system determines a phase error term, representing a phase error applied by the distortion source, from the combined signal. A second combining element applies the phase error term to a phase component of the input signal. A polar-to-rectangular converter reintegrates the precorrected phase component and the magnitude component of the input signal into a precorrected output signal.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

The present invention relates to a precorrection system and method for precorrecting for phase distortion induced by a filtering element following a limiting amplifier. This allows for the compensation presently performed by larger, more costly analog equalizers to be performed in the digital domain, at a significant decrease in cost and power consumption. By filtering element, it is intended to include any element following the amplifier that causes linear distortion in the phase of the signal. This can include, for example, a high power radio frequency (RF) multiplexer that combines a plurality of RF signals for transmission. The present invention can be used generally for any signal processing application benefiting from precorrection for phase distortion.

As stated above, the filtering element can be modeled as a linear filter. Generally, to correct for a linear filter, an input signal can be predistorted using the inverse of the filter. It will be appreciated, however, that the inverse filter will introduce some amplitude modulation on the signal. The limiting amplifier would strip off all or most of this amplitude modulation, resulting in a different waveform reaching the filtering element. The output of the filtering element will thus contain uncorrected phase distortion.

Instead, a phase correction containing no amplitude modulation is provided to an input signal. This phase correction will pass through limiting amplifier since it has no amplitude modulation. Had the phase correction included amplitude modulation as well, for example by pre-distorting by the inverse frequency response of the filtering element, the limiting amplifier would not have passed through the pre-distorted signal intact. Hence any pre-distortion scheme applied to a system with a limiting amplifier, must be restricted to producing a constant envelop signal, as the presence of the limiting amplifier fundamentally limits the type of pre-correction that is possible.

Figure 1:
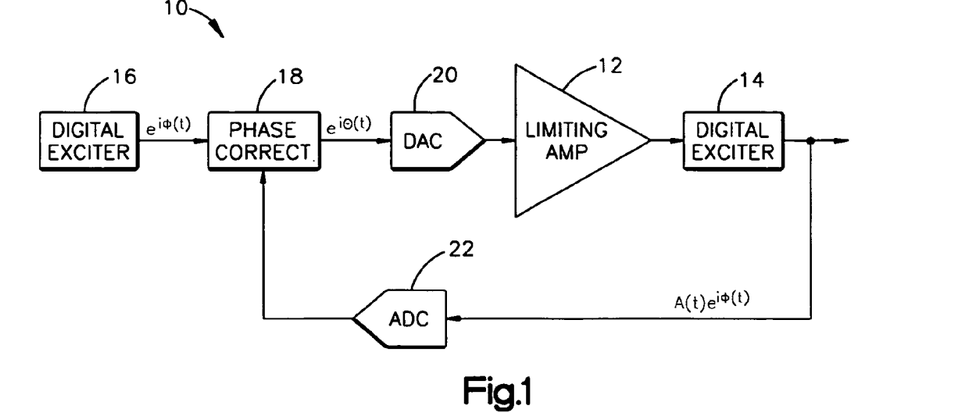
FIG. 1 illustrates a transmitter system in accordance with an aspect of the present invention.

FIG. 1 illustrates a transmitter system 10 in accordance with an aspect of the present invention. The transmitter system 10 includes a limiting amplifier 12 that provides its output to a filtering element 14 that can be modeled as a linear filter. A constant envelope signal is provided from a digital exciter 16. For example, the signal can comprise a frequency modulated (FM) signal or a phase modulated (PM) signal.

The constant envelope signal is provided to a phase precorrector 18 that applies a phase correction to the signal. Since the filtering element 14 can be modeled as a linear filter, the error applied to the signal can be modeled as an additive error such that:

$$y_t = x_t + \sum_{j=1}^{N} a_j x_{t-j} \qquad \text{Eq. 1}$$

where $x_t$ is the input signal to the filter at a time, t, $y_t$ is the output of the filter associated with $x_t$, and $a_j$ is a $j^{th}$ filter coefficient associated with the filter.

Since the input signal to the filtering element 14, $x_t$, has a constant envelope, we can represent a desired input signal to the filter as $e^{i\theta(t)}$, a desired filter output as $c_t e^{i\phi(t)}$, and the error imposed by the filtering element 14 as $Ae^{i\gamma(t)}$, such that:

$$c_t e^{i\phi(t)} = e^{i\theta(t)} + Ae^{i\gamma(t)} \Rightarrow c_t e^{i\phi(t) - i\gamma(t)} = e^{i\theta(t) - i\gamma(t)} + A \qquad \text{Eq. 2}$$

Applying the Sine Theorem:

$$\frac{\sin(\phi(t) - \gamma(t))}{1} = \frac{\sin(\pi - [\phi(t) - \gamma(t)] - [\pi - \{\theta(t) - \gamma(t)\}])}{A} \qquad \text{Eq. 3}$$

$$= \frac{\sin([\phi(t) - \gamma(t)] - [\phi(t) - \gamma(t)])}{A}$$

Taking the arcsine of both sides:

$$\arcsin(A \sin[\phi(t) - \gamma(t)]) = [\theta(t) - \gamma(t)] - [\phi(t) - (\gamma(t)] = \theta(t) - \phi(t) \qquad \text{Eq. 4}$$

Accordingly, an appropriate estimate for phase error, $\epsilon = \theta(t) - \phi(\tau)$, associated with the filtering element 14 can be determined from the desired output signal, $\phi(t)$, and the behavior of the filter. It will be appreciated, however, that when the amplitude, A, of the filter error, $Ae^{i\gamma(t)}$ is large, there will not necessarily be a real solution for the phase error, $\epsilon$. Accordingly, the precorrection can only be applied when the error induced by the filtering element is small (e.g., the signal power of the error is smaller than the power of the input signal.

The output of the phase precorrector 18, $e^{i\theta(t)}$, is converted to an analog signal at a digital-to-analog converter 20. The precorrected analog signal is then amplified at the limiting amplifier 12. For example, the limiting amplifier can comprise a power amplifier operating at saturation. It will be appreciated that the limiting amplifier 12 allows little or no amplitude modulation with the signal to pass through, such that any amplitude modulation contained in the amplifier input will be substantially eliminated in the amplifier output.

The output of the limiting amplifier 12 is provided to the filtering element 14. The filtering element 14 can comprise any element that can be modeled to a reasonable degree of accuracy as a linear filter. In an exemplary implementation of the present invention, the filtering element 14 can comprise an RF multiplexer that is operative to combine several high power RF signals prior to broadcast or transmission. It will be appreciated that the filtering element 14 can impose both amplitude and phase distortion on the amplifier output. In accordance with an aspect of the present invention, the phase precorrector 18 mitigates only the phase distortion associated with the filtering element 14, leaving any amplitude distortion. The output, $A(t)e^{i\phi(t)}$, of the filtering element 14 can be provided to an antenna (not shown) for traditional broadcast or to an appropriate arrangement for transmission in an alternative medium.

In one implementation, the output, $A(t)e^{i\phi(t)}$, of the filtering element 14 can be sampled and fed back to the phase precorrector 18 through an analog-to-digital converter 22. The output of the filtering element can be used for adaptive precorrection of the signal, as the characteristics of the filtering element can be determined from this data and utilized to update a filter model associated with the phase precorrector 18.

Figure 2:
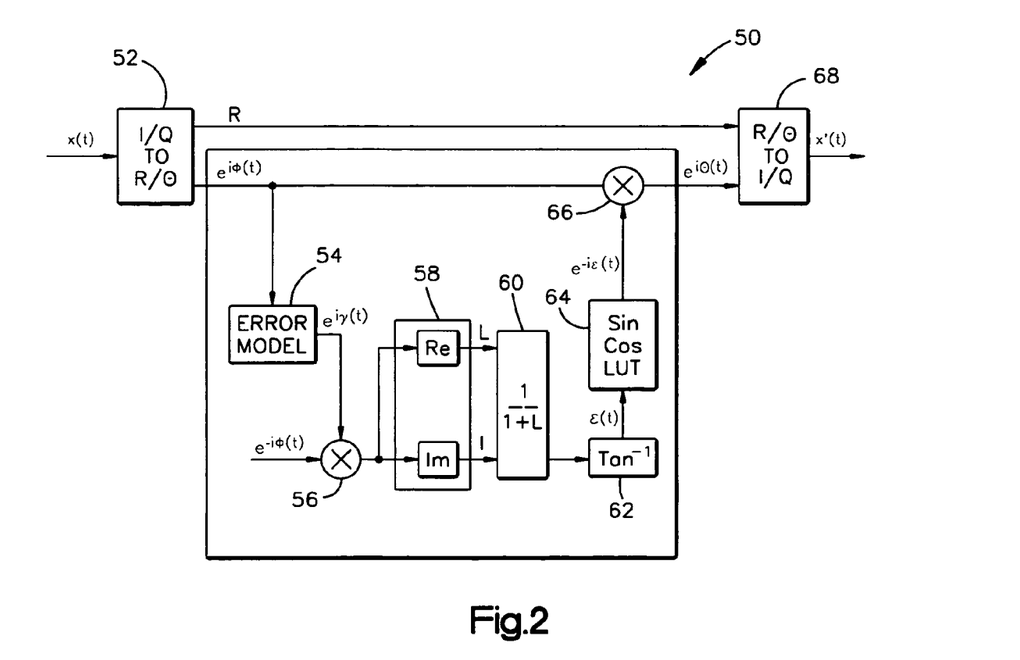
FIG. 2 illustrates a functional block diagram of an exemplary implementation of a phase precorrector in accordance with an aspect of the present invention.

FIG. 2 illustrates a functional block diagram of an exemplary implementation of a phase precorrector 50 in accordance with an aspect of the present invention. The precorrector 50 includes a rectangular-to-polar converter 52 that separates the input signal into a time varying phase component, $e^{i\phi(t)}$ and a magnitude component, R. The phase component is provided to an error model 54 that simulates an error, $e^{i\gamma(t)}$, imposed by a filtering element associated with the phase precorrector 50. For example, the error model 54 can comprise a model of the filtering element with a main filter tap associated with the model set to zero.

A signal, $e^{-i\phi(t)}$, representing a complex conjugate of a desired phase component of the filtering element output, $e^{i\phi(t)}$, can be generated and provided to a first multiplexer 56 as a first input. For example, the complex conjugate, $e^{-i\phi(t)}$, can be calculated at a sine/cosine lookup table for a known value of $\phi(t)$ or derived from the input signal, $e^{i\phi(t)}$. A second input to the first multiplexer 56 is the error term, $e^{i\gamma(t)}$, provided by the error model, such that the output of the first multiplexer is equal to $e^{i[\gamma(t) - \phi(t)]}$.

The output of the first multiplexer 56 is provided to a real/imaginary separator 58, which outputs real and imaginary components of the multiplexer output. Techniques for real/imaginary signal separation are known in the art. A real component of the signal, $\cos[\gamma(t) - \phi(t)]$ (denoted as L in FIG. 2), and an imaginary component of the signal, $\sin[\gamma(t) - \phi(t)]$ (denoted as I in FIG. 2) are provided to a divider 60. The divider 60 calculates a value equal to the ratio of the imaginary part of the signal to the sum of one and the real part of the signal, such that the output, $I/(1+L)$, of the divider 60 is equal to:

$$\frac{I}{1+L} = \frac{\sin[\gamma(t) - \phi(t)]}{1 + \cos[\gamma(t) - \phi(t)]} \qquad \text{Eq. 5}$$

The output of the divider is provided to an arctangent function 62 that calculates the arctangent of the divider output. In one implementation, the arctangent function 62 can be implemented as a look-up table, although it will be appreciated that other methods of calculating the arctangent can be used in accordance with an aspect of the present invention. The calculated arctangent represents a phase error, $\epsilon$, that will approximate the phase error applied by the filtering element.

Appropriate signal values for precorrecting the phase component of the input signal, $e^{i\phi(t)}$, for the phase error, $\epsilon$, can be determined at a sine/cosine look-up table 64. For example, the additive inverse of the phase error can be determined and corresponding sine and cosine values can be referenced at the look-up table 64. Accordingly, a signal, $e^{-i\epsilon}$, representing a phase precorrection can be generated and provided as a first input to a second multiplexer 66. The phase component, $e^{i\phi(t)}$, of the input signal is also provided as a second input to the second multiplexer 66. The output of the second multiplexer 66 is a corrected phase component that can be amplified and provided to the filtering element. This corrected phase component, along with the signal envelope, R, can be combined at a polar-to-rectangular converter 68 to produce a phase precorrected output signal, x'(t), for the precorrector.

Figure 3:
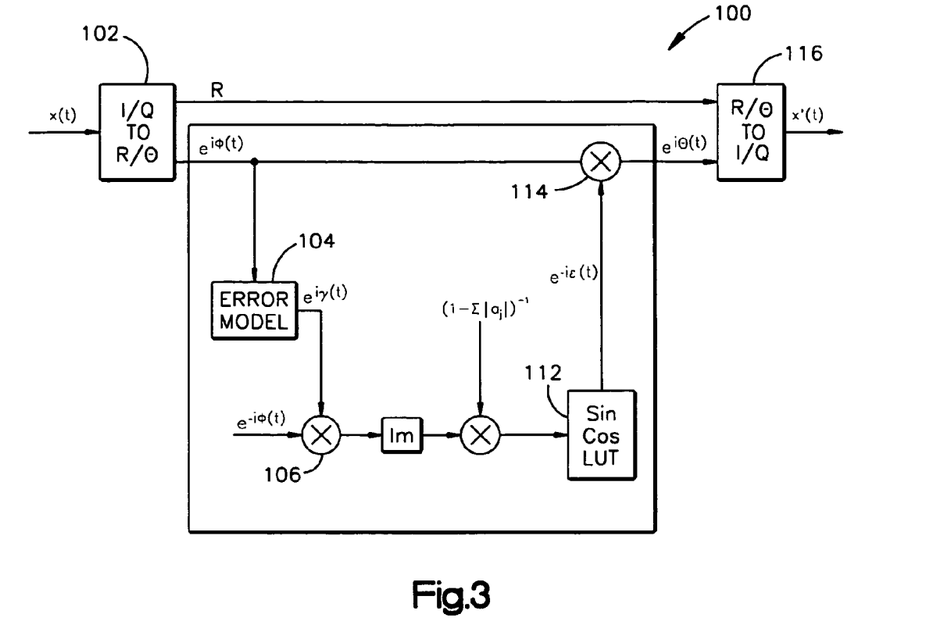
FIG. 3 illustrates a functional block diagram of a second exemplary implementation of a phase precorrector in accordance with an aspect of the present invention.

FIG. 3 illustrates a functional block diagram of a second exemplary implementation of a phase precorrector 100 in accordance with an aspect of the present invention. The precorrector 100 includes a rectangular-to-polar converter 102 that separates the input signal into a time varying phase component, $e^{i\phi(t)}$, and a magnitude component, R. The phase component is provided to an error model 104 that simulates an error, $e^{i\gamma(t)}$, imposed by a filtering element associated with the phase precorrector 100. For example, the error model 104 can comprise a model of the filtering element with a main filter tap associated with the model set to zero.

A signal, $e^{-i\phi(t)}$, representing a complex conjugate of a desired phase component of the filtering element, $e^{i\phi(t)}$, can be generated and provided to a first multiplexer 106 as a first input. For example, the complex conjugate, $e^{-i\phi(t)}$, can be calculated at a sine/cosine lookup table for a known value of $\phi(t)$ or derived from the input signal, $e^{i\phi(t)}$. A second input to the first multiplexer 106 is the error term, $e^{i\gamma(t)}$, provided by the error model, such that the output of the first multiplexer is equal to $e^{i[\gamma(t)-\phi(t)]}$.

An imaginary component of the output of the first multiplexer 106 is extracted at a signal separator 108. Techniques for real/imaginary signal separation are known in the art. The imaginary component of the signal, $\sin[\gamma(t)-\phi(t)]$ is provided as a first input to a second multiplexer 110. A constant value, $(1-\Sigma_{j=0}|a_j|)$, where $a_j$ represents a filter coefficient associated with a $j^{th}$ tap of the error model with a main tap of the filter is represented as j=0, is provided as a second input to the second multiplexer. The value approximates a function of the real component of the output of the first multiplexer 106. The output of the second multiplexer represents a phase error, $\epsilon$, that will approximate the phase error applied by the filtering element.

Appropriate signal values for precorrecting the phase component of the input signal, $e^{i\phi(t)}$, for the phase error, $\epsilon$, can be determined at a sine/cosine look-up table 112. For example, the additive inverse of the phase error can be determined and corresponding sine and cosine values can be referenced at the look-up table 112. Accordingly, a signal, $e^{-i\epsilon}$, representing the precorrection can be generated and provided as a first input to a third multiplexer 114. The phase component, $e^{i\phi(t)}$, of the input signal is provided as a second input to the third multiplexer 114. The output of the third multiplexer 114 is a corrected phase component that can be amplified and provided to the filtering element. This corrected phase component, along with the signal envelope, R, can be combined at a polar-to-rectangular converter 116 to produce a phase precorrected output signal, x'(t), for the precorrector.

A filtering element functioning as a minimum phase filter (i.e., a filter having a causal and stable inverse), can be precorrected with a reasonable level of precision with a single additive phase correction, as illustrated in FIGS. 2 and 3. In some implementations, however, the filtering element will be non-causal. In such a case, the precorrection can be applied iteratively, in a series of successive approximations to an ideal precorrected corrected input signal for the filter. It will be appreciated that this iterative approach will work whether or not the output filter causing the distortion is minimum phase. The iterative approach allows the necessary precorrection to be applied in a stable manner in exchange for a delay in signal processing.

Figure 4:
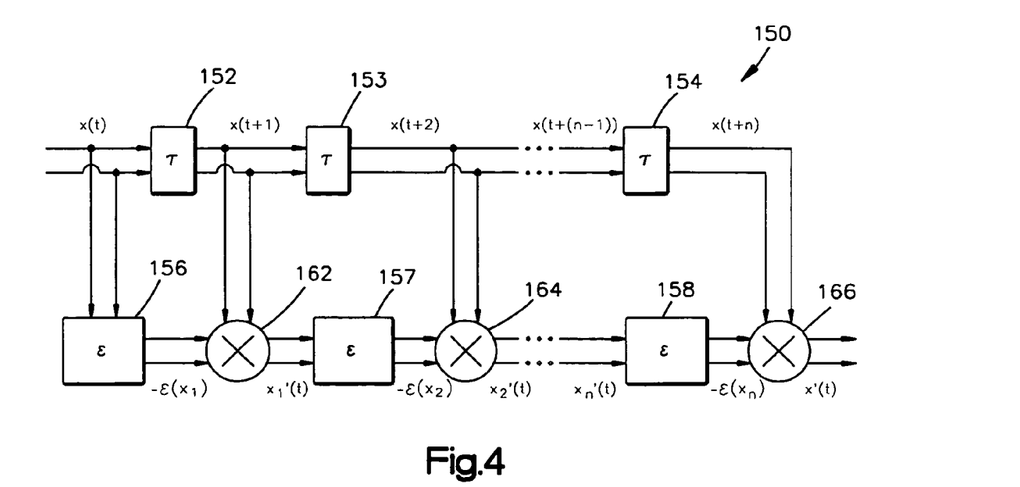
FIG. 4 illustrates an iterative precorrection system in accordance with an aspect of the present invention.

FIG. 4 illustrates an iterative precorrection system 150 in accordance with an aspect of the present invention. The iterative precorrection system 150 precorrects an information-carrying input signal over a series of iterative stages to counteract the distorting effects of an associated filtering element having non-minimum phase characteristics. The output of each iterative stage provides a successively better approximation of an ideal precorrected signal that eliminates all phase distortion from the output of the filtering element. It will be appreciated that the illustrated system 150 can be implemented as a set of software instructions for a computer processor or as one or more hardware signal processing components. In an exemplary embodiment, the system 150 is implemented as part of a field programmable gate array.

The illustrated precorrection system 150 comprises one or more delay components 152-154. Each delay component delays an input signal, x(t) by a predetermined amount. In an exemplary embodiment utilizing a plurality of delay components, the delay components can be connected in series, such that the output of each delay component reflects a cumulative delay over the preceding delay components. The period of delay introduced by each of the delay components can be determined according to various characteristics of the input signal and the associated linear filtering element. For example, for precorrecting a digital input signal within an RF broadcasting system, the delays can depend on the bandwidth of the system and the sampling rate of the digital signal.

The precorrection system 150 further includes a series of error models 156-158. Each error model 156-158 calculates an approximate precorrection term, $\epsilon(x)$, from an associated input x(t). It will be appreciated that each error model 156-158 can comprise appropriate hardware and/or software for determining an error term from the input, x(t), and a desired phase for the system output. One skilled in the art can ascertain appropriate implementations for the error models 156-158 from the exemplary precorrector implementations illustrated in FIGS. 2 and 3. For example, a given error model can determine a precorrection term according to the following function:

$$\varepsilon(\theta_n) = e^{-i\frac{\text{Im}\left(e^{-i\phi}\sum_{j\neq 1}a_j e^{\theta_n(t-j)}\right)}{1+\text{Re}\left(e^{-i\phi}\sum_{j\neq 1}a_j e^{\theta_n(t-j)}\right)}} \qquad \text{Eq. 6}$$

where $e^{\theta n(t)}$ represents a phase component of an input signal to an $n^{th}$ error model of the plurality of error models 156-158 at a time, t, $\phi$ represents a desired phase for the output of the filtering element, $a_j$ represents a filter coefficient associated with a $j^{th}$ tap of the error model with a main tap of the filter is represented as j=0.

Alternatively, to simplify the calculations involved in the precorrection, the function associated with the error model can be approximated and implemented as:

$$\varepsilon(\theta_n) \cong e^{-i \frac{\text{Im}\left(e^{-i\phi} \sum_{j \neq 1} a_j e^{\theta_n(t-j)}\right)}{1 - \sum_{j \neq 1} |a_j|}} \quad \text{Eq. 7}$$

In some implementations, a calculated phase error term within each error model 156-158 can be scaled by a factor of k, where k is less than or equal to one, to slow down the convergence of the iterative precorrection process. The effect of the scaling is to provide a more robust result for the iterative precorrection at the cost of more delay introduced into the signal. It will be appreciated that the value of k can be determined as a function of an acceptable period of delay and various characteristics of the filtering element causing the phase distortion. It will further be appreciated that the value for k can vary as the filter model is updated. In a system utilizing scaling, the exemplary precorrection term of Eq. 6 becomes:

$$\varepsilon(\theta_n) = e^{-ik \frac{\text{Im}\left(e^{-i\phi} \sum_{j \neq 1} a_j e^{\theta_n(t-j)}\right)}{1 + \text{Re}\left(e^{-i\phi} \sum_{j \neq 1} a_j e^{\theta_n(t-j)}\right)}} \quad \text{Eq. 8}$$

where $$\frac{\text{Im}\left(e^{-i\phi} \sum_{j \neq 1} a_j e^{\theta_n(t-j)}\right)}{1 + \text{Re}\left(e^{-i\phi} \sum_{j \neq 1} a_j e^{\theta_n(t-j)}\right)}$$

is a phase error term associated with a given error model and k is a scaling coefficient.

Similarly, the exemplary precorrection term of Eq. 7 becomes:

$$\varepsilon(\theta_n) \cong e^{-ik \frac{\text{Im}\left(e^{-i\phi} \sum_{j \neq 1} a_j e^{\theta_n(t-j)}\right)}{1 - \sum_{j \neq 1} |a_j|}} \quad \text{Eq. 9}$$

where $$\frac{\text{Im}\left(e^{-i\phi} \sum_{j \neq 1} a_j e^{\theta_n(t-j)}\right)}{1 - \sum_{j \neq 1} |a_j|}$$

is a phase error term associated with a given error model and k is a scaling coefficient.

During operation, an input signal x(t) is provided to a first error model 156, which produces an associated first precorrection term, $-\epsilon(x_1)$. The first precorrection term provides a first input to a first complex multiplier 162. The second input to the first complex multiplier 162 is a delayed representation, x(t+1), of the input signal, x(t), provided from a first delay element 152. The output of the first complex multiplier 162 is a first precorrected signal, $x_1'(t)$, that approximates the ideal precorrected signal.

The first precorrected signal is provided to the second error model 157. The second error model 157 generates a second precorrection term, $-\epsilon(x_2)$, as a function of the first precorrected signal, $x_1'(t)$, and a desired phase for an output of the filtering element. The second precorrection term provides a first input to a second complex multiplier 164. The second input to the second complex multiplier 164 is a second delayed representation, x(t+2), of the input signal, x(t), provided from a second delay element 153. The output of the second complex multiplier 164 is a second precorrected signal, $x_2'(t)$, that provides a closer approximation of the ideal precorrected output signal than the first precorrected signal, $x_1'(t)$.

The precorrected signals can continue to be refined though a plurality of iterative stages to achieve a desired degree of accuracy. To this end, a penultimate precorrected signal $x_n'(t)$ is provided to an $n^{th}$ error model 158 to generate a final precorrection term, $-\epsilon(x_n)$, as a function of the penultimate precorrected signal, $x_n'(t)$, and a desired phase for an output of the filtering element. The final precorrection term provides a first input to a final complex multiplier 166. The second input to the final complex multiplier 166 is a final delayed representation, x(t+n), of the input signal, x(t), provided from an $n^{th}$ delay element 154. The output of the final complex multiplier 166 provides a final precorrected output, x'(t), for the precorrection system.

Figure 5:
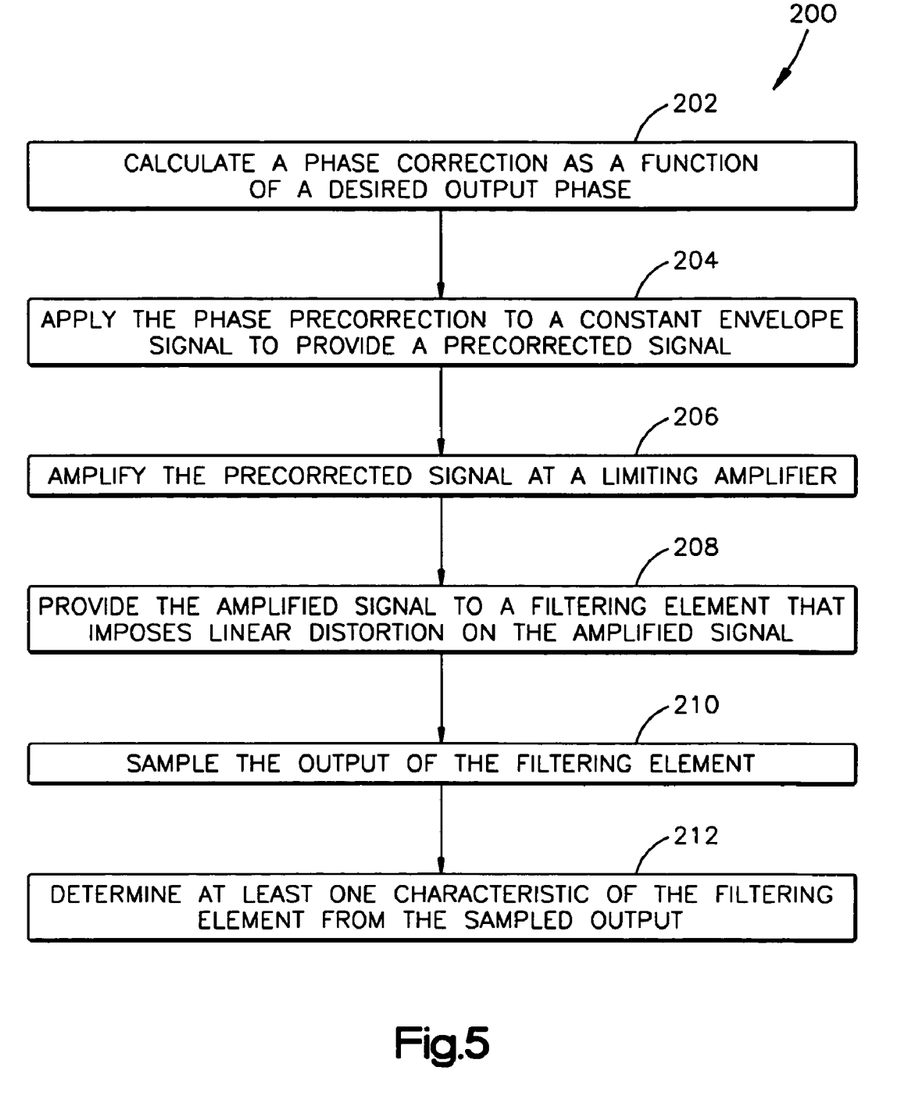
FIG. 5 illustrates a methodology for transmitting a constant envelope signal in accordance with an aspect of the present invention.

FIG. 5 illustrates a methodology 200 for transmitting a constant envelope signal in accordance with an aspect of the present invention. At step 202, a phase correction is calculated as a function of a desired output phase. For example, in one implementation, an error signal can be calculated according to an error model incorporating one or more determined characteristics of the filtering element. The error signal is multiplexed with a signal representing the desired output phase to generate a combined signal. A phase error can then be extracted from the combined signal. The phase precorrection is generated as a signal having a phase equal and opposite to the phase error.

At step 204, the calculated phase precorrection is applied to a constant envelope signal to provide a precorrected signal. In accordance with an aspect of the present invention, the calculated phase precorrection is operative to adjust the phase of the constant envelope signal without imposing amplitude modulation on the constant envelope signal. At step 206, the precorrected signal is amplified at a limiting amplifier that substantially eliminates any amplitude correction associated with the precorrected constant envelope signal.

At step 208, the amplified signal is provided to a filtering element that imposes linear distortion on the amplified signal. Due to the phase precorrection applied to the input signal at step 204, the distortion imposed by the filtering element adjusts the phase of the amplified signal such that it becomes equal to the desired output phase. At step 210, the output of the filtering element is sampled and fed back into the transmitter system. One or more characteristics of the filtering element are determined from the sampled output at step 212. These determined characteristics of the filtering element can be utilized at step 202 to calculate appropriate phase correction for future inputs.

It will be understood that the above description of the present invention is susceptible to various modifications, changes and adaptations, and the same are intended to be comprehended within the meaning and range of equivalents of the appended claims. The presently disclosed embodi- Having described the invention, the following is claimed:

1. A system for precorrecting a constant envelope input signal comprising:
   a phase precorrection component that generates a precorrected input signal by applying a phase precorrection to the constant envelope input signal to alter an associated phase of the constant envelope input signal without applying amplitude modulation to the constant envelope input signal, such that the applied phase correction mitigates the group delay distortion applied by an associated linear distortion source that behaves as a non-minimum phase linear filter, the phase precorrection component comprising a plurality of iterative stages, each iterative stage being operative to provide a progressively better approximation of an ideal precorrected input signal.

2. The system of claim 1, wherein the phase precorrection component comprises:
   a rectangular-to-polar converter that separates the constant envelope input signal into a phase component and a magnitude component;
   an error model that generates a signal error term from the phase component of the constant envelope input signal;
   a first combining element that combines the signal error term with a term representing a desired phase for the output of the linear distortion source to provide a combined signal;
   a phase extraction system for extracting a phase error term, representing a phase error applied by the linear distortion source, from the combined signal;
   a second combining element that applies the phase error term to a phase component of the constant envelope input signal; and
   a polar-to-rectangular converter that reintegrates the precorrected phase component and the magnitude component of the constant envelope input signal into the precorrected input signal.

3. The system of claim 2, wherein the error model comprises a filter model of the linear distortion source, comprising a plurality of filter tap coefficients, in which a coefficient associated with a main filter tap is set to zero.

4. The system of claim 1, wherein the constant envelope input signal is a frequency modulated audio signal.

5. The system of claim 1, wherein the linear distortion source comprises a high power RF multiplexer.

6. The system of claim 1, further comprising a limiting amplifier that receives the precorrected input signal from the phase precorrection component and provides an amplified output to the linear distortion source, the limiting amplifier being operative to substantially eliminate any amplitude modulation from the precorrected input signal.

7. A method for transmitting a constant envelope signal, comprising the steps of:
   calculating a phase precorrection as a function of a desired output phase, wherein calculating the phase precorrection comprises:
      calculating an error signal according to determined characteristics of a filtering element;
      multiplexing the error signal with a signal representing the desired phase to generate a combined signal;
      extracting a phase error from the combined signal; and
      generating the phase precorrection as a signal having a phase equal and opposite to the phase error;
   applying the calculated phase precorrection to a constant envelope signal to provide a precorrected signal, the phase precorrection adjusting the phase of the constant envelope signal without imposing amplitude modulation on the constant envelope signal;
   amplifying the precorrected signal at a limiting amplifier, the limiting amplifier substantially eliminating any amplitude correction associated with the precorrected signal; and
   providing the amplified signal to a filtering element that imposes linear distortion on the amplified signal, such that the phase of the amplified signal becomes equal to the desired output phase.

8. The method of claim 7, further comprising the steps of:
   sampling the output of the filtering element; and
   determining at least one characteristic of the filtering element from the sampled output;
   wherein the step of calculating a phase correction comprises calculating the phase correction as a function of the desired output phase and the determined at least one characteristic of the filtering element.

9. The method of claim 7, wherein calclating an error signal comprises the steps of:
   translating the constant envelope signal into a polar signal comprising a phase component and an amplitude component; and
   distorting the phase component of the polar signal at a filter model representing the filtering element to produce the error signal.

10. The method of claim 7, wherein the step of generating the phase correction comprises:
    determining an additive inverse of the phase error; and
    referencing sine and cosine values corresponding to the additive inverse of the phase error at a look-up table.

11. The method of claim 7, wherein the step of extracting a phase error from the combined signal comprises the steps of:
    separating the combined signal into real and imaginary components;
    determining a ratio of the imaginary component of the combined signal to a function of the real portion of the signal; and
    calculating the arctangent of the determined ratio.

12. The method of claim 7, wherein the step of extracting a phase error from the combined signal comprises the steps of:
    isolating an imaginary portion of the combined signal; and
    estimating the phase error as the ratio of the imaginary portion of the combined signal to a constant associated with the filtering element.

13. The method of claim 12, wherein the filtering element is approximated by a linear filter model comprising a plurality of filter taps having associated coefficients, the constant associated with the filtering element comprising the sum of the absolute values of the coefficients associated with the plurality of taps comprising the filter model, excluding a coefficient associated with a main tap of the filter.

14. The method of claim 7, where the steps of calculating a phase precorrection and adding the calculated phase precorrection to a constant envelope signal are performed as part of an iterative process, such that the method further comprises the following steps:
    calculating a second phase precorrection as a function of a desired output phase and the precorrected signal; and
    adding the calculated second phase precorrection to a delayed representation of the constant envelope signal to provide a second precorrected signal.

15. The method of claim 14, wherein the step of calculating the second phase correction comprises:

calculating a second error signal according to determined characteristics of the filtering element and the precorrected signal;

multiplexing the second error signal with a signal representing the desired phase to generate a combined signal;

extracting a second phase error from the combined signal;

multiplying the extracted second phase error by a scaling coefficient selected to slow the convergence of the iterative process to provide a scaled phase error; and generating the second phase precorrection as a signal having a phase equal and opposite to the scaled phase error.

16. A precorrection system for applying a linear phase precorrection to a constant envelope input signal comprising:

a rectangular-to-polar converter that separates the constant envelope input signal into a phase component and a magnitude component;

an error model that generates a signal error term from the phase component of the input signal;

a first combining element that combines the signal error term with a term representing a desired phase for an output of an associated distortion source to provide a combined signal;

a phase extraction system for determining a phase error term, representing a phase error applied by the distortion source, from the combined signal;

a second combining element that applies the phase error term to a phase component of the input signal; and a polar-to-rectangular converter that reintegrates the precorrected phase component and the magnitude component of the input signal into a precorrected output signal.

17. The system of claim 16, wherein the first combining element and the second combining element comprise respective first and second complex multipliers.

18. The system of claim 16, wherein the phase extraction system comprises:

means for extracting a phase error from the combined signal; and a sine/cosine look-up table;

wherein the phase extraction system is operative to determine a phase error term as a function of the sine and cosine of the additive inverse of the extracted phase error.

19. The system of claim 16, wherein the distortion source comprises a high power RF multiplexer.

\* \* \* \* \*